S. A. KOSLOFF.
Electric-Light.
No. 166,877. Patented Aug. 17, 1875.
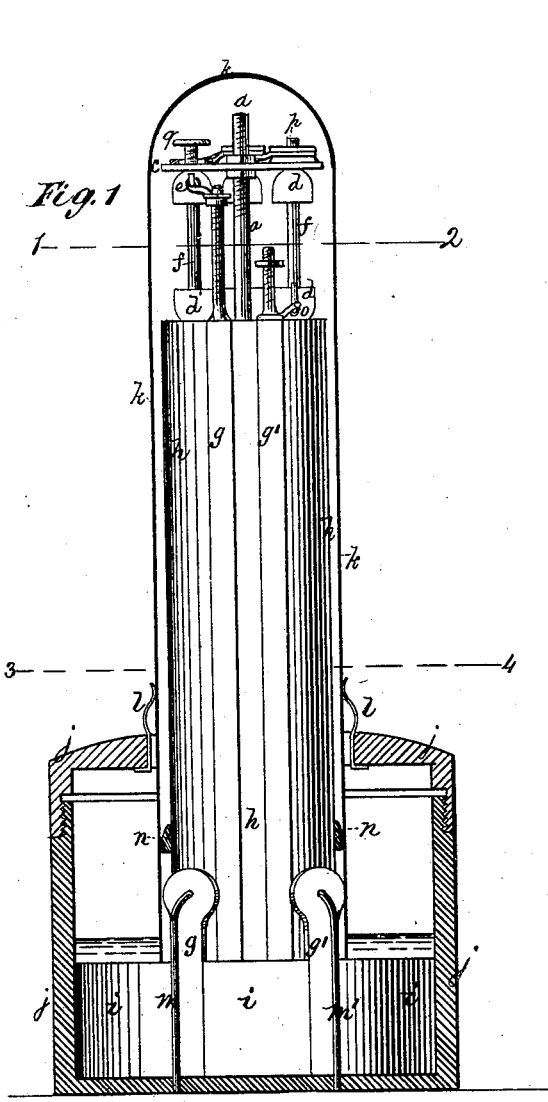
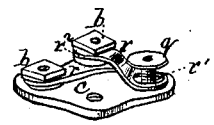
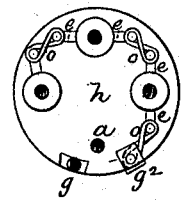
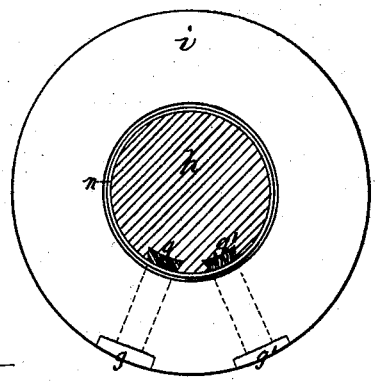
Witnesses:
Fred Haynes
Ferd Fusch
S. A. Kosloff
by his Attorneys
Brown & Allen

UNITED STATES PATENT OFFICE.

STEPHANE ALEXANDROVITCH KOSLOFF, OF PARIS, FRANCE.

IMPROVEMENT IN ELECTRIC LIGHTS.

Specification forming part of Letters Patent No. 166,877, dated August 17, 1875; application filed June 23, 1875.

*To all whom it may concern:*

Be it known that I, STEPHANE ALEXANDROVITCH KOSLOFF, of Paris, in the Republic of France, have invented an Improved Electric Lamp; and I do hereby declare that the following is a full, clear, and exact description of the same, reference being had to the accompanying drawing, which forms part of this specification.

My invention relates to certain improvements in that class of apparatus for the production of electric light wherein an electric current passes through and heats sticks of carbon placed in the circuit and hermetically closed in a globe filled with nitrogen-gas, and the object is to avoid several disadvantages heretofore existing.

Heretofore it has been usual to place the carbon on metal conductors, which served as supports, and were firmly attached to the carbons either by screws or otherwise. This joining together of two non-homogeneous substances, subject to different temperatures, caused the breakage of the carbon because of its not dilating in the same ratio as the metal, or because the dilatation of the metal was greater than that of the carbon, and the metal in heating detached itself gradually from the carbon and produced electric sparks. To remedy this difficulty one part of my invention consists in placing the carbon between two insulating-supports composed of porcelain, clay, glass, calcined magnesia, or other insulating substance, so arranged as to allow a slight movement of the carbon in the supports.

Another part of my invention relates to a means for preventing a difficulty which arises in cases where the metal is outwardly attached to the carbon in any way, in consequence of which the metal detaches itself in heating, and produces electric sparks and becomes melted. This part of my invention consists in introducing the metal into the carbon, whereby I obtain a better contact when the carbon is heated by the current, and also prevent the production of electric sparks; but in order to avoid putting the metal into direct contact with a white-heated carbon, I use thicker pieces of carbon provided with holes through their length and their thickness, which thicker pieces serve as conductors of the electric current, and not being such poor conductors as the thin sticks of carbon with which the light is to be produced, and which are introduced into the thicker pieces, heat to a less degree the metal introduced into them.

Another part of my invention consists in connecting the principal conductors with the metallic wires, which are inserted into the thick pieces of carbon by means of links of fine twisted wire, whereby sufficient motion is allowed them when in a state of dilatation, and whereby sufficient contact is insured without producing electric sparks. This mode of connection does not increase the loss of electric current, because the heat produced by an electric current passing through two pieces of metal not firmly attached to each other, but closely touching each other, is much smaller than the heat caused by contact with a white-heated body in a high temperature.

Another part of my invention relates to means for avoiding the inconvenience of the preparation of nitrogen gas and its introduction into the lamp after the air has been withdrawn from it; and it consists in the method of rarefying the air in the globe by means of the carbon which is heated by the electric current and produces the light. By dilating the air it is caused to escape out of the globe through a cup-valve surrounding the supporting column upon which the globe rests, which valve prevents the air from again entering the globe. The small quantity of oxygen remaining in the rarefied air in the globe is transformed into oxide of carbon. In order to have as little air as possible in the globe, I make the supporting column nearly as large in diameter as the globe itself, so as to reduce the dimensions of the air-space, and also of sufficient height to enable it to support the bearers carrying the sticks of carbon which produce the light. The supporting column is made of porcelain, clay, calcined magnesia, crystal, or other suitable insulating substance, provided with tubular openings or grooves for the passage of the metallic conductors, or of carbon furnished with insulators, when such conductors are used instead of metallic ones. The supporting column may be made of metal, if desired; but in such case it should be provided with insulators, in order that the currents may meet in the sticks of carbon. The globe and supporting column are of sufficient length, according to the strength of the light to be produced, to prevent the valves from being exposed to too great a heat, and to allow of the employment, as a hydraulic closing, of any liquid, which, being exposed to a certain heat, will not produce vapors which will consume the carbon. For this purpose I entirely avoid the use of mercury.

Another part of my invention relates to a mode of overcoming a difficulty which may arise where the electric current is not sufficiently strong to heat a thick stick of carbon; and it consists in the employment of a number of thin sticks of carbon, arranged so as to be heated successively, and to provide for the automatic passage of the electric current from one to another. The wires which traverse the thick pieces of carbon may be inserted not at the same height, but one slightly lower than the next preceding one. In case of breakage of one of the thinner portions the large or thick end, being fastened on one side only, will incline toward the link or ring connection of the second carbon, and, by means of its hook-shaped wire or plate, is placed in connection with said second carbon, and the current being interrupted in the first carbon is communicated to the second; and this operation is repeated in case of the breakage of the second or any succeeding carbon. In lamps containing several carbons the insulators, between which the thick or large ends of the carbons rest, are of rounded form, with small openings, provided with means for preventing said thick ends from descending too low. In such lamps one pole is in communication with the lower ends of all the carbons, and the other pole communicates with the carbon, which is to be lighted first—that is, the one in which the metallic wire is placed at the highest point.

When it is not desirable to use the automatic mechanism in lamps containing several carbons I employ a commutator, where one pole is in communication with the lower end of all the carbons, while the other pole may be put into communication with each series of carbons in different lamps having separate conductors. The placing of the lamps in the circuit may be effected in two ways—namely, either by placing one series of lamps united by a metallic wire, in such a manner that the current will traverse all the carbons, the conductor of one pole being in communication with the first lamp, and the conductor of the other pole being in communication with the last lamp, or by subdividing the current—that is to say, the current from one pole is subdivided from one point and conducts the current by separate conductors to each lamp, and the current of the other pole subdivided in the same way meets the current of the first pole in each lamp.

In order to enable those skilled in the art to which my invention appertains to more fully understand the same, I will describe in detail the accompanying drawing, in which—

Figure 1 is a sectional elevation. Fig. 2 is a perspective view of the upper end. Fig. 3 is a sectional view taken in the line 1 2 of Fig. 1. Fig. 4 is a sectional view taken in the line 3 4 of Fig. 1.

$a$ represents a vertical supporting-rod; $b$, nuts for retaining the insulating-plate; $c$, insulating-plate, having four holes for the passage of metallic pins; $d$, large ends of carbon, bored throughout their whole length and thickness by a drill of the same dimensions as the carbon $f$ and of the wires $e$ inserted into these large ends; $e$, hooks; $f$, carbon pins driven into the large ends, and intended to produce the light; $g$, conductor of one pole; $g'$, conductor of the other pole. These two conductors are of copper, and may be silvered or platinized. They are inserted in a groove in the column $h$, except in the lower part, which allows vulcanized india-rubber to pass between the insulating-piece and the metal conductors, which may be afterward bound with metallic wires. $h$, a column of porcelain or other suitable substance, serving as a support, and also to leave the least possible air in the globe; $i$, porcelain or other ring, having a hole in it, and serving as the base of the apparatus, and provided with grooves for the passage of the conductors $g$ and $g'$; $j$, porcelain basin or bowl, the cover of which is bored for the passage of the glass globe $k$, which rests on the piece $i$, and is kept steady by springs $l$. The bowl $j$ has holes, through which pass the exterior conductors $m$ $m'$, which are connected with the interior conductors $g$. $n$, a leather ring, cupped in the form of a valve, allowing air to pass out of the globe, but preventing it from entering.

The large ends of the carbon $d$, which are below, are placed upon the column $h$, and are provided with metal hooks $e$, which are split and separated when the links or connections $o$ are put in their places, to cause the current to pass, and to communicate it to the conductor $g'$ in such manner that the carbons are not insulated as long as the large ends of the carbons above, bearing the screwed metal pin $p'$, which enter in the insulating-plate $c$, do not touch one another, and it is only the first carbon intended to burn which is in communication with the conductor $g$ by the aid of a hook, $e$, and the connection $o$. This first carbon carries a washer or perforated disk, $q$, screwed on the upper part of the pin $p$, but only descending to the plate $c$.

The second carbon upon the pin $p$ carries a washer, $q$, upon which is placed a plate, $r$, having two holes, the one large, $r^1$, and the other small, $r^2$, and retained by a nut, $b$. $r^2$ is bound between the washer and the screw, while $r^1$ allows the pin $p$ of the first carbon to pass through without touching it. If the first carbon breaks, the large end of the carbon $e$ will descend and bring down the ring $q$ upon the piece $r$, which will establish a current between the first and the second carbon, and so on throughout. We place liquid in the bowl $j$, in such manner as to slightly cover the lower edge of the globe $k$. I employ, by preference, olive-oil, because it disengages no vapors when at a certain degree of temperature.

I claim—

1. The carbon electrodes provided with insulated supports independent of the metallic conductor, substantially as herein described.

2. The combination of the carbon-pins $f$, having the enlarged ends $d$, with the metal conductors $e$, inserted into the said enlarged ends of the carbons, substantially as shown and described, for the object specified.

3. The combination of the carbon-pins $f$, having the enlarged ends $d$, the wires $e$, and the links $o$, flexibly connecting said wires and the principal conductors, as herein shown and described.

4. The supporting column $h$, arranged within and filling a portion of the globe or cover $k$, substantially as and for the purpose herein specified.

5. The combination of the globe $k$, the column $h$, and the valve $n$, surrounding said column between it and the globe, and constructed to permit the escape of the dilated air from the globe, and prevent the entrance of the external air, substantially as shown and described.

6. The combination of the thin sticks of carbon $f$, their enlarged ends $d$, the wires $e$, inserted in said enlarged ends, the flexible connections $o$, the insulating plate $c$, the plates $r$, screw-pins $p$, washers $q$, and nuts $b$, substantially as and for the purpose described.

7. The combination, with the series of carbon electrodes, and a flexible connection communicating with the electric conductors, and constructed to automatically pass the electric current from one carbon electrode to the other in case of the breakage of either, as set forth.

STEPHANE ALEXANDROVITCH KOSLOFF.

Witnesses:
A. LE BLANC,
E. PAGÉS.